Jan. 1, 1952 W. S. TANDLER ET AL 2,581,216
VENDING AND DISPENSING DEVICE
Filed Oct. 21, 1947 7 Sheets-Sheet 2
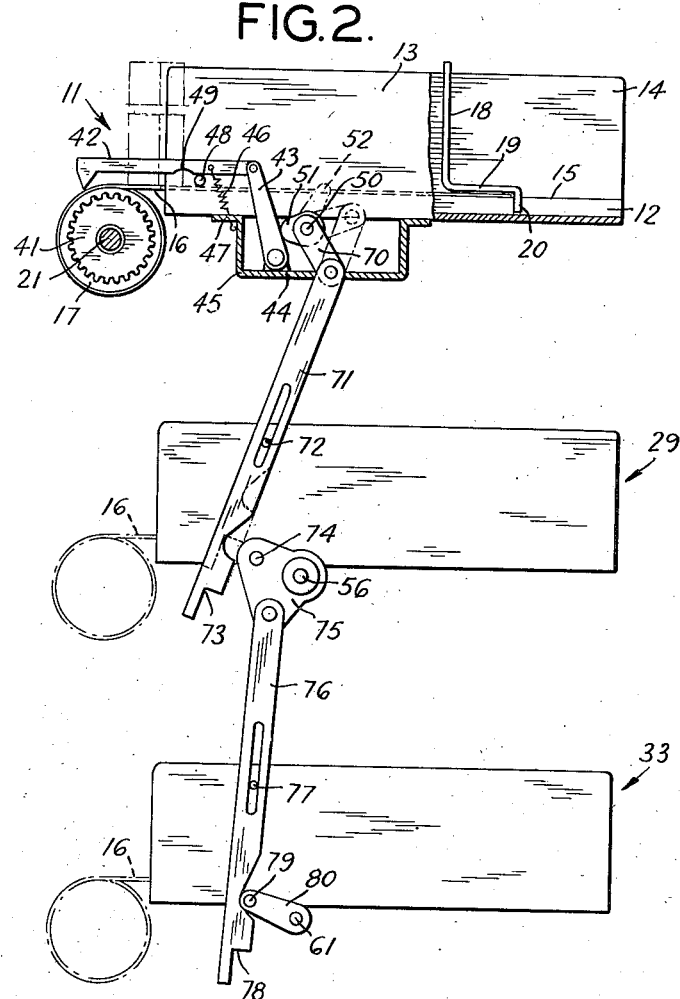
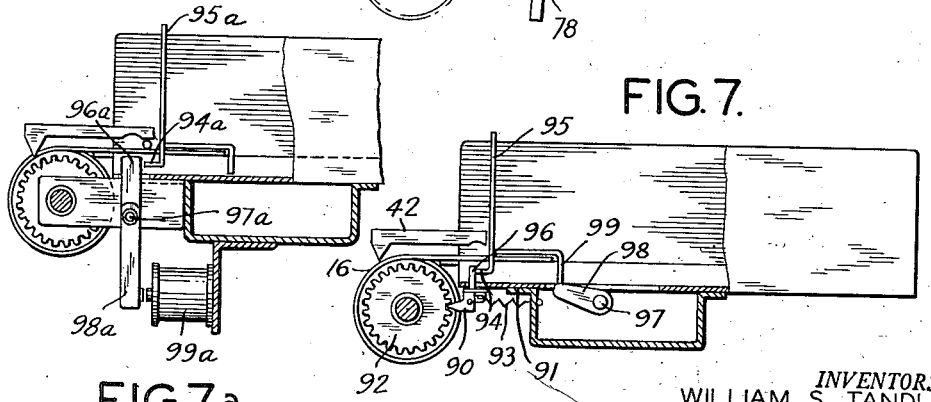
INVENTORS.
WILLIAM S. TANDLER
ROBERT G. FLEURIOT &
BY CARLTON F. PECK
Campbell Brumbaugh + Free
THEIR ATTORNEYS.

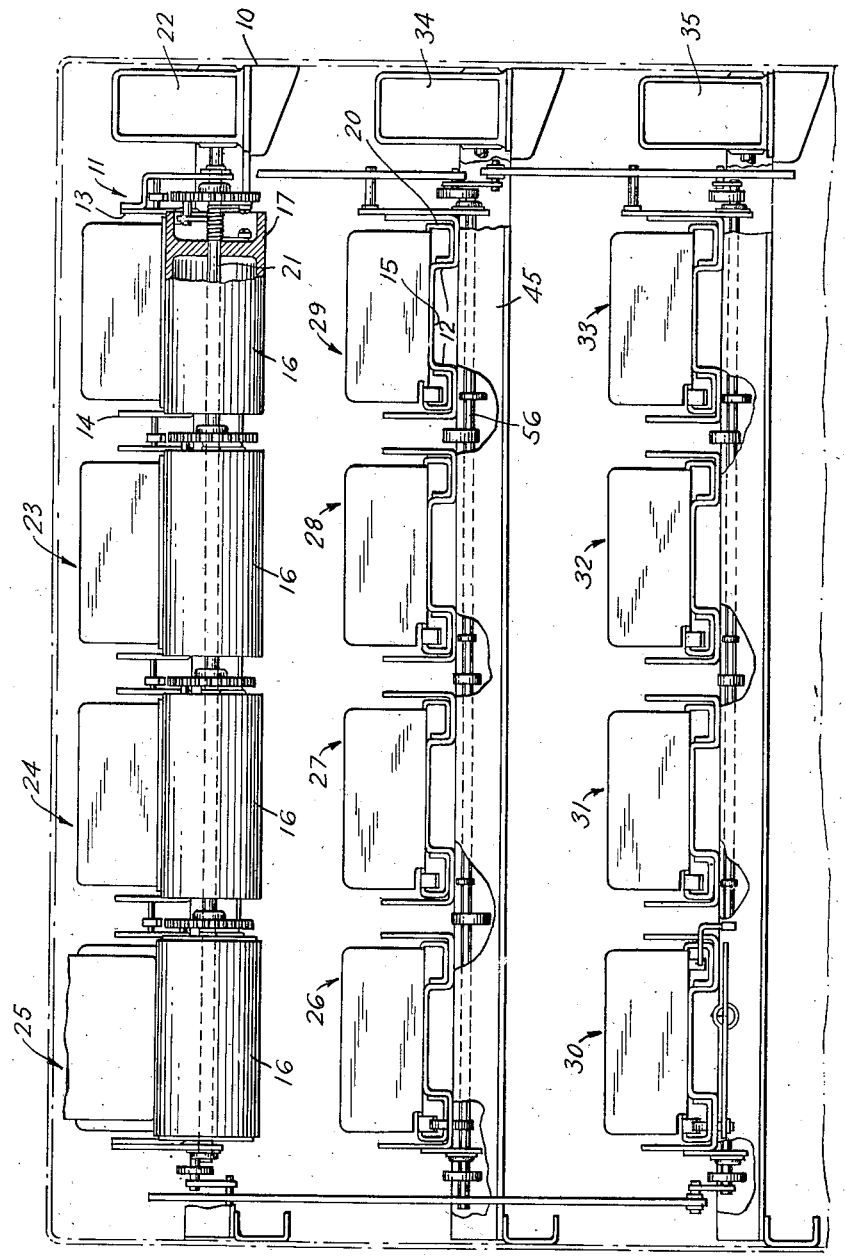

Jan. 1, 1952 W. S. TANDLER ET AL 2,581,216
VENDING AND DISPENSING DEVICE
Filed Oct. 21, 1947 7 Sheets-Sheet 3

INVENTORS.
WILLIAM S. TANDLER
BY ROBERT G. FLEURIOT &
CARLTON F. PECK
Campbell, Brumbaugh & Free
THEIR ATTORNEYS.

Jan. 1, 1952 W. S. TANDLER ET AL 2,581,216
VENDING AND DISPENSING DEVICE
Filed Oct. 21, 1947 7 Sheets-Sheet 4

INVENTORS.
WILLIAM S. TANDLER
BY ROBERT G. FLEURIOT &
CARLTON F. PECK

Campbell, Brumbaugh & Free
THEIR ATTORNEYS.

Jan. 1, 1952 W. S. TANDLER ET AL 2,581,216
VENDING AND DISPENSING DEVICE
Filed Oct. 21, 1947 7 Sheets-Sheet 5

INVENTORS.
WILLIAM S. TANDLER
ROBERT G. FLEURIOT &
BY CARLTON F. PECK

THEIR ATTORNEYS.

Jan. 1, 1952     W. S. TANDLER ET AL     2,581,216
VENDING AND DISPENSING DEVICE
Filed Oct. 21, 1947     7 Sheets-Sheet 6

INVENTORS.
WILLIAM S. TANDLER
ROBERT G. FLEURIOT &
CARLTON F. PECK
BY

*THEIR ATTORNEYS.*

Jan. 1, 1952 W. S. TANDLER ET AL 2,581,216
VENDING AND DISPENSING DEVICE
Filed Oct. 21, 1947 7 Sheets-Sheet 7

INVENTORS.
WILLIAM S. TANDLER
ROBERT G. FLEURIOT &
BY CARLTON F. PECK

*Campbell, Brumbaugh Free*

THEIR ATTORNEYS.

Patented Jan. 1, 1952

2,581,216

UNITED STATES PATENT OFFICE 2,581,216

VENDING AND DISPENSING DEVICE

William S. Tandler, New York, N. Y., Robert G. Fleuriot, Englewood, N. J., and Carlton F. Peck, New York, N. Y., assignors to Vendomatic Machine Corporation, New York, N. Y., a corporation of Delaware Application October 21, 1947, Serial No. 781,210

3 Claims. (Cl. 312—71)

This invention relates to dispensing devices of the type disclosed in the Tandler et al. application Serial No. 676,226, filed June 12, 1946, and the Tandler et al. Patent No. 2,500,437, granted March 14, 1950, Tandler et al. Patent No. 2,500,438, granted March 14, 1950, and the Tandler et al. Patent No. 2,531,238, granted November 21, 1950. It relates more particularly to improved clutching and power-transferring mechanisms for such dispensing devices and to the mechanism driven thereby for discharging articles successively from the supporting elements or units of such dispensing devices.

The above-referred to application and patents disclose various types of supports for articles to be dispensed and clutching and actuating mechanisms therefor whereby an article may be selected and dispensed from the device by the insertion of a coin in the dispensing apparatus and the actuation of a selector switch. Among the mechanisms disclosed therein are pawl and ratchet drives for supporting belts for the articles, mechanical clutching mechanisms which are either controlled by solenoid devices or by the emptying of a preceding dispensing unit. Many of these mechanisms are rather complex and expensive to manufacture, and while satisfactory from a standpoint of mechanical or electrical operation, they may render the cost of such dispensing devices excessive, and moreover they may require the use of higher power motors and regular supervision and repairs.

Generally, these prior devices operate on the principle that the discharge of an article from its support will terminate the operation of the dispensing unit thereby preventing the dispensing of more than one article at a time. In these prior devices, the size of the article being dispensed is of no importance, for the discharge of an article terminates the dispensing operation.

An object of the present invention is to provide improved forms of clutching mechanisms for coupling a supporting conveyer or pusher member to a source of power.

A further object of the invention is to provide an improved type of mechanical transfer mechanism for causing sequential operation of a series of dispensing units without the use of independent motors for the operation of the transfer mechanism.

A further object of the invention is to provide novel clutching mechanisms for coupling a source of power to the conveyer belt or pusher mechanism of a dispensing unit, whereby friction between the drive mechanism and the pusher member or support is reduced to a minimum when the dispensing unit is disconnected from the operating source of power.

A further object of the invention is to provide an improved form of dispensing mechanism including a mechanically controlled article-detecting device for terminating a dispensing operation.

A further object of the invention is to provide improved forms of electrical control systems for rendering the dispensing device effective to dispense an article.

Other objects of the invention will become apparent from the following description of typical forms of dispensing units embodying the present invention.

In accordance with the present invention, we have provided an improved form of dispensing unit including a novel form of clutch which may be readily engaged and disengaged to couple the dispensing mechanism to a source of power, such as a motor-driven shaft. Moreover, the invention includes novel forms of actuating mechanisms for coupling and uncoupling the dispensing units and the source of power, including either mechanically or electrically controlled systems for accomplishing this operation.

More particularly, one form of clutch utilized in accordance with the present invention is a spring clutch which is characterized by a helical spring wound around the drive shaft and tensioned in such a direction as to normally grip the shaft and cause the supporting conveyer or pusher member to move with the drive shaft. The device further includes a brake member, such as, for example, a ratchet, which is connected to one end of the spring so that when the brake member is retarded the spring is unwound to disconnect the drive shaft from the conveyer or pusher member.

In a modified form of clutch, the same principles are involved with the exception that instead of a spring, a positive toothed clutch is provided which normally is engaged to connect the supporting conveyor and/or pusher member to the drive shaft but which can be released by retarding the movement of the braking ratchet mechanism.

The braking member cooperating with the braking element associated with the clutch may be of various kinds, but when a ratchet or ratchets are used, this cooperating braking element preferably consists of a pawl or pawls which engage the ratchet to prevent further rotation of the ratchet.

The invention includes various mechanisms for engaging and disengaging the pawl and ratchet to control the operation of the supporting conveyer or pusher member. Such controls may consist of suitably actuated rotary or oscillatory cams. These cams may be mechanically actuated by a preceding dispensing unit to cause the units to operate in succession, or they may be solenoid controlled and directly responsive to actuation of a selector switch to cause the dispensing operation to take place.

The advantages of the mechanisms described generally above are that they are relatively simple in structure, positive in action in that they normally tend to connect the drive shaft with the supporting conveyer or pusher, but when released they exert minimum friction drag on the drive shaft, thereby permitting relatively low-powered motors to be used in actuating the dispensing device. Moreover, they make it possible to use a simplified type of transfer mechanism for actuating successively several dispensing units in a row or in several rows with positive recycling through the entire series of units.

For a better understanding of the present invention, reference may be had to the accompanying drawings, in which:

Figure 1 is a view in front elevation of a portion of a dispensing device and casing therefor with parts shown broken away and with parts removed in order to disclose details of construction;

Figure 2 is a view in side elevation and partly broken away of the device disclosed in Figure 1 with the casing not shown therein to better disclose details of the construction;

Figure 4 is an end view of a linkage system for transferring the operation of a dispensing unit in a lower row to a higher row of dispensing units;

Figure 7 is a view in side elevation of a pawl mechanism for disengaging the clutch mechanism when the unit is in a sold out condition;

Figure 7A is a view in side elevation of a part of a dispensing unit having a modified control for preventing operation of a unit when it is in a sold out condition;

Figure 17:
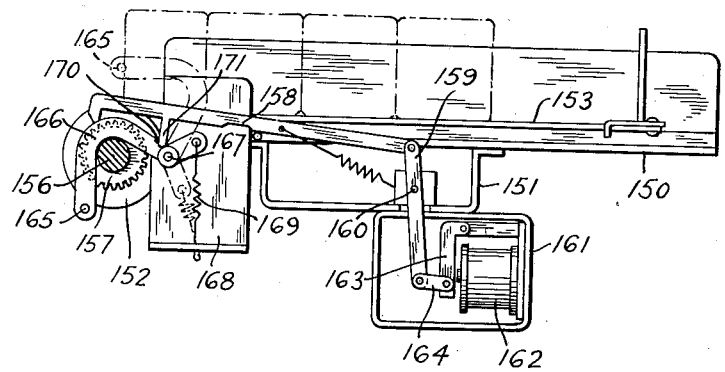
Figure 18:
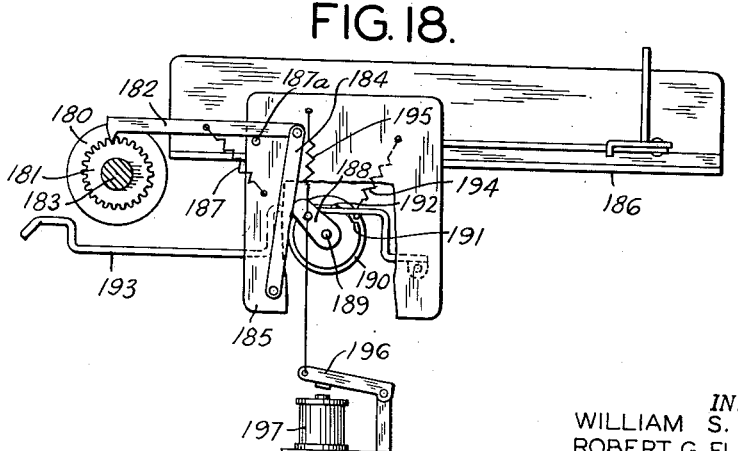

Figure 17 is a view in side elevation of a modified form of dispensing unit providing individual selection of merchandise under the control of a solenoid and an automatic block; and Figure 18 is a view in side elevation and partly broken away of still another form of dispensing unit, providing individual selection of merchandise and having an automatic clutch release actuated by dispensing of one article of merchandise.

The device chosen for purposes of illustration may include a cabinet 10 like those disclosed in the above-referred to Tandler et al. application and patents. The cabinet is not disclosed in detail herein, inasmuch as it is not a part of the present invention. It is generally box like in shape and has a plurality of dispensing units mounted in a series of horizontal rows, as illustrated generally in Figures 1 and 2 of the drawings. The dispensing units are adapted to receive horizontal rows of merchanidse to be dispensed, such as, for example, books, boxes, packages, food stuffs and the like. A portion of the cabinet 10 may be used to house equipment such as a refrigerating unit, electric motors, a cooking unit and the like, as disclosed in the Tandler et al. Patent No. 2,531,238.

Referring now to Figures 1 and 2 of the drawings, a typical dispensing unit 11 may include a support 12 which may take the form of a channel member having side flanges 13 and 14 and a bottom having a raised center portion 15 adapted to receive and support a conveyer belt 16, as best shown in Figures 1 and 2. The conveyer belt may be of the endless type, if desired, but preferably it has one end fixed to a roller 17 and is wound up on the roller 17 as the latter is rotated. The conveyer belt 16 is provided with a pusher plate 18 having a rearwardly extending portion 19 resting on the center portion 15 and having downwardly extending flanges 20 at its opposite edges extending into the channels on opposite sides of the center portion 15 of the support.

The drive roller or rotary member 17 is rotatably mounted on a drive shaft 21 which extends transversely of the case or housing 10 and is connected at one end to an electric motor 22 which rotates the shaft counterclockwise, as viewed in Figure 2. If desired, the shaft 21 may extend through bearings in the unit 11 and others in the same horizontal row.

Additional units 23, 24 and 25 in the same horizontal row may have their rollers also mounted rotatably on the shaft 21.

Other horizontal rows of elements 26, 27, 28, 29 and 30, 31, 32 and 33 are driven, respectively, by the motors 34 and 35 which are also mounted on the side of the casing 10.

Figure 5:
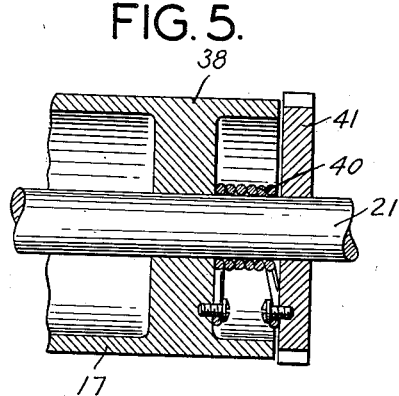
Figure 5 is a view in vertical section taken through one end of the actuating roller disclosing details of one form of spring clutch mechanism for connecting the roller and the drive shaft.
Figure 6:
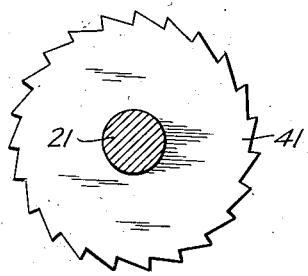
Figure 6 is an end view of the spring clutch mechanism shown in Figure 5.

Referring now to Figures 2, 5 and 6, the roller 17 may be of hollow cylinder form and is provided with a bearing element 38 adjacent each end for supporting the roller for rotation on the shaft 21. As shown in Figures 5 and 6, the bearing member 38 at the right-hand end of the roller is secured to one end of a helical spring 40 which is wrapped around the shaft 21 and is under tension so that it normally tends to grip the shaft 21. The spring 40 is wound in a direction, for example, a right-hand winding, so that when the shaft 21 rotates counterclockwise, as viewed in Figure 2 or Figure 3, the spring tends to tighten around the shaft 21 and to turn the roller 17 in the same direction.

The clutching mechanism further includes an element for partially unwinding the spring to release the roller 17 from the shaft 21. This element comprises a braking member such as the ratchet 41, which is rotatably mounted on the shaft 21 and is connected to the opposite end of the spring 40 so that the ratchet normally tends to rotate with the shaft 21 and the spring 40. However, when the ratchet 41 is retarded or stopped, the action of the shaft 21 on the spring 40 is such as to cause it to unwind partially, thereby releasing the grip of the spring on the shaft and disconnecting the roller 17 from the shaft 21. As shown in Figure 2, the mechanism for retarding or stopping rotation of the ratchet 41 may consist of a pawl member 42 which is pivotally connected to the end of a lever 43 which is pivotally supported on a bracket or lug 44 extending up from a channel member 45 which extends transversely of the casing 10 and supports the upper horizontal row of units in the casing 10. The pawl 42 is normally urged toward the ratchet 41 by means of a spring 46 connected to the pawl and a flange 47 on the edge of the channel member 45. The pawl 42 also engages a pin 48 projecting laterally from the side plate 13 of the support and is provided with a notch 49 which receives the pin 48 to permit the pawl to rock into engagement with the teeth of the ratchet 41.

When the pawl 42 is in engagement with the ratchet 41, the roller 17 is released from the shaft 21 so that the conveyor 16 is stopped and the articles supported thereon are not advanced relatively to the support 12.

When the ratchet 41 is released by movement of the pawl 42 to the position shown in Figure 2, the shaft 21 is coupled by means of the spring 40 to the roller 17 so that the roller 17 rotates, winds up the conveyor 16 thereon and advances the articles along the member 12.

Figure 3:
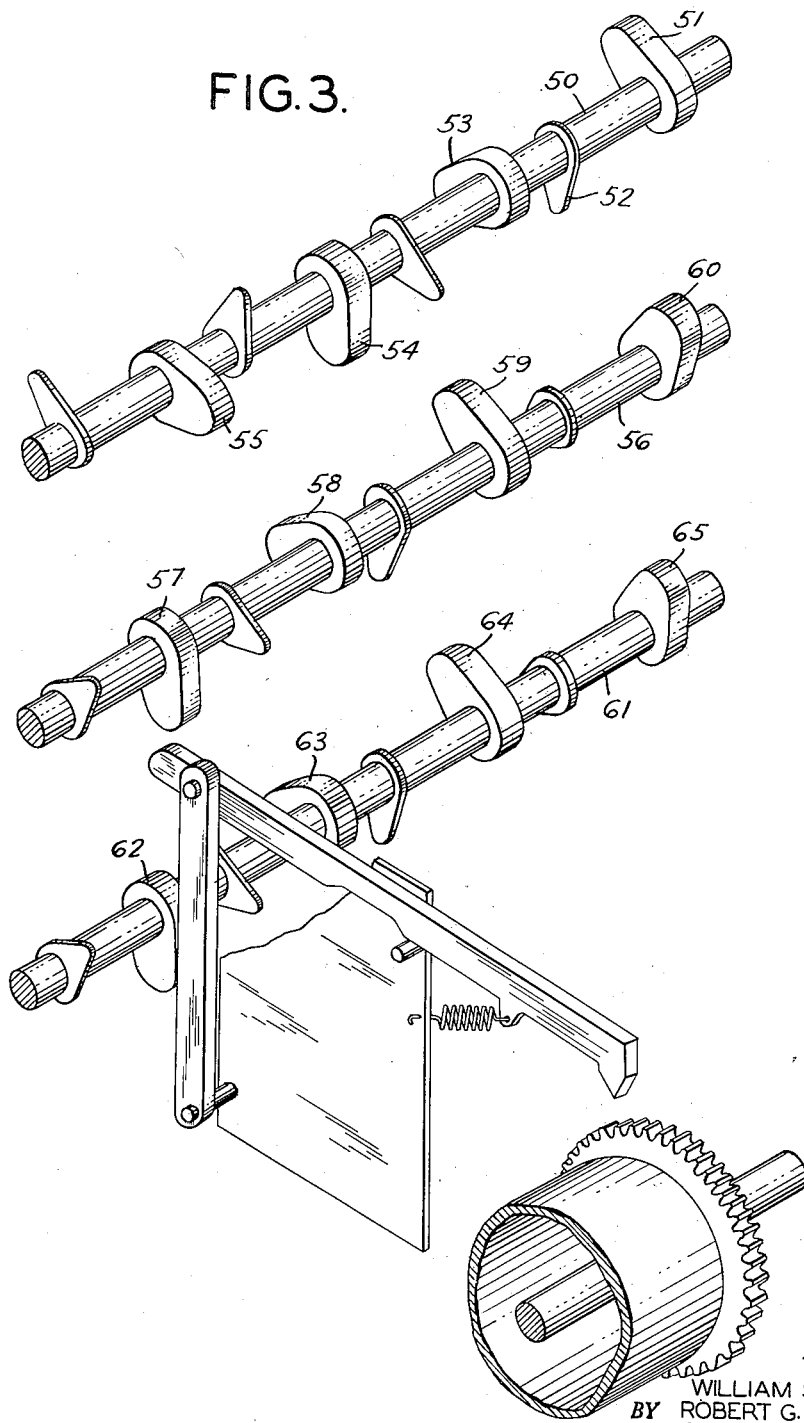
Figure 3 is an isometric view of the cam shafts and a portion of the actuating mechanism of a device illustrating diagrammatically the relation of the cams on the camshafts for sequential operation of the transfer mechanism.

The ratchet 41 is released by means of a camshaft 50 (Figures 2 and 3) which extends transversely of the casing 10 and of the entire row of dispensing units 11, 23, 24 and 25. The shaft 50, as shown in Figure 3, is provided with a cam member 51 which is disposed behind the lever 43 (Figure 2) and when rotated to the position shown in Figure 2, lifts the pawl 42 out of engagement with the ratchet 41. When this cam is rotated through an angle, in the embodiment shown, of about 72° the lobe of the cam 51 permits the lever 43 to rock clockwise to engage the pin 48 in the notch 49 of the pawl 42, thereby permitting the pawl 42 to engage the ratchet 41.

Rotation of the camshaft 50 to produce this action is controlled by movement of the conveyor belt 16 so that when the conveyor belt has discharged all of the articles therein, or has moved to a position in which all of the articles should be discharged therefrom, the roller is disconnected from the shaft 21. Rotation of the camshaft 50 is produced by means of another cam or lever 52 fixed to the camshaft 50 which is in alignment with one of the downwardly directed flanges 20 on the pusher plate 18. Thus, when the pusher plate 18 has advanced to a position where the last article thereon should be discharged, the finger or flange 20 rocks the cam 52 and the camshaft 50 through a sufficient angle to cause the pawl 42 to engage the ratchet 41 and prevent further rotation of the roller 17.

The transfer mechanism whereby the units 11, 23, 24 and 25 are actuated in succession, will now be described. As indicated above, the portion of the camshaft 50 adjacent to each dispensing unit is provided with cams corresponding to the cams 51 and 52 of the dispensing unit 11.

These cams are illustrated in Figure 3, and the cams corresponding to cam 51 are identified as cams 53, 54 and 55. The cams 51, 53, 54 and 55 are arranged in angular relationship, as best shown in Figure 3. Thus, in a dispensing unit, including four units, the angular relationship between the cams 51, 53, 54 and 55 will be 72° each, while the angular relationship between the cam 55 and the cam 51 is about 144°. This angular relation corresponds to five steps of the camshaft of 72° each.

With the cam 51 in the position shown in Figure 2, completion of the movement of the pusher 18 to the left, rotates the cams 51 and 52 to stop the conveyer 16 and bring the cam 53 into position to condition the unit 23 for operation. This action is repeated until the camshaft 50 assumes the position shown in Figure 3.

With the cam 55 in the position shown in Figure 3, in which the dispensing unit 25 is connected to the shaft 21, the cam 51 has progressed to a position three steps beyond and is two steps away from the position shown in Figure 2. The reason for this relationship will be explained hereinafter.

The next lower row of dispensing units 26, 27, 28 and 29 is also provided with a similar camshaft 56 which is provided with the pawl controlling cams 57, 58, 59 and 60, as well as cams corresponding to cam 52.

The next lower row of dispensing units 30, 31, 32 and 33 is also provided with a camshaft 61 carrying the cams 62, 63, 64 and 65. The angular relationship of the cams on the camshafts 56 and 61 is similar to the angular relationships of the cams 51 to 55, although, as indicated in Figure 3, all of the cams on the shafts 56 and 61 are out of positions in which the pawls controlled thereby can engage the ratchets of the units associated therewith. In the position shown in Figure 3, only the cam 55 corresponding to the unit 25 (Figure 1) is in a position to cause operation of its corresponding unit.

The operation of the cams together with other structure now to be described is such as to transfer the drive from the unit 25 to the unit 29 and from the unit 29 to the unit 33 and from the unit 30 in the third row to the unit 11 in the first row. This transfer is accomplished by means of the linkage systems disclosed in Figures 2 and 4 of the drawings. As shown in Figure 2, the camshaft 50 is provided with a lever 70 carrying pivotally a link or a thrust member 71 which is guided by means of a pin 72 extending through a slot in the link. The thrust member is provided with a notch 73 for engagement with a pin 74 extending from a triangular member 75 fixed to the end of the camshaft 56. The triangular member 75 also is provided with a thrust member 76 which is guided by means of a pin 77 and is provided with a notch 78 to engage a pin 79 on a lever 80 fixed to the end of the camshaft 61. The opposite end of the camshaft 61 is provided with a lever 81 which drives a thrust member 82 having a notched end 83 which is engageable with a pin 84 on a lever 85 carried by the camshaft 50.

The notches inwardly of the ends of the thrust members 71, 76 and 82 provide clearance for the pins 74, 79 and 84, as the levers are rotated.

The lever 85 on the camshaft 50 is spaced about 108° from the lever 70 at the opposite end of the camshaft 50 and assumes the position shown in Figure 4 when the camshaft 50 is in the position shown in Figure 3.

The levers 80 and 81 on the shaft 61 have the relation shown also. In operation, and with the cams in the position shown in Figure 3, the dispensing unit 25, that is, the last unit to be actuated in its row, is in operation and the cam 55 will remain in this position until the unit has completed discharge of all the articles therefrom. At this time, the camshaft 50 is rotated by the cam of unit 25 corresponding to the cam 52 so that all of the cams on the shaft 50 are rotated 72° clockwise and also, the lever 70 is rotated counterclockwise, as viewed in Figure 2. The lever 70, has, however, been advanced three steps and the notch 73 is now in engagement with the pin 74 on the member 75.

As a result, when the shaft 50 is moved one step, the link 71 will rock the camshaft 56 72° counterclockwise, as viewed in Figure 2. As a result, the cam 60 on the camshaft 56 will be moved to a substantially horizontal position and will cause the pawl controlled thereby to be disengaged from the corresponding ratchet of the unit 29, allowing the motor 34 to drive the unit 29.

When the unit 29 has reached its emptied position, the camshaft 56 is rotated one step to bring the cam 59 in a position to connect its dispensing unit 28 with the motor 34.

The units 27 and 26 are in the same way engaged successively with the motor 34 in order to discharge their contents. When the unit 26 has discharged its contents, the shaft 56 will have been rotated sufficiently to bring the notched end 78 of the link 76 into the position overlying the pin 79, and upon further counterclockwise rotation of the shaft 56 through one step at the conclusion of the operation of the dispensing unit 26, the lever 80 and the camshaft 61 will be rotated counterclockwise one step to cause the cam 65 of the unit 33 to rock its pawl out of engagement with its corresponding ratchet. The units 33, 32, 31 and 30 are connected successively by stepwise rotation of the camshaft 61 and when the last unit 30 is emptied, the lever 81 will have moved to within two steps counterclockwise of the position shown in Figure 4 and the notch 83 will be below and in engagement with the pin 84 which has stepped around one step counterclockwise beyond the position shown in Figure 4. Rotation of the shaft 61 at the conclusion of the dispensing operation of unit 30 will move the lever 81 one step counterclockwise and will similarly rotate the shaft 50 one step counterclockwise to bring the elements into the position shown in Figure 2, thereby reconnecting the roller 17 to the drive shaft 21 and starting the sequence of dispensing operation over again.

The two steps of the shaft 50 between the end of a dispensing operation of the last unit 25 in the top row and the beginning of a dispensing operation of the first unit 11 are necessary to permit the intermediate transfer step from the top row to the middle row. If an additional transfer step were not provided, the drive transfer would take place from the unit 25 directly back to the unit 11.

While the above-described transfer mechanism is disclosed with three horizontal rows of dispensing units, it will be understood that two or more than three rows of dispensing units can be actuated successively in a similar manner. It will be understood, further, that the motors 22, 34 and 35 do not operate continuously but are under the control of suitable selector switches which cause one article to be dispensed for each actuation of the selector switch or switches, as disclosed in the Tandler et al. prior application and patents.

In order to assure disengagement of the clutch of a unit when the unit is sold out, and to prevent recycling of the series of empty units, an additional pawl member 90 may be pivotally supported on the under surface of the support 12 and may be urged away from the ratchet 92 by means of a spring 93. The pawl 90 is engaged with the ratchet by means of a forwardly projecting finger 94 on the pusher plate 95. The pawl 90 engages the ratchet only in the event that the unit is sold out and a transfer is started from a preceding unit. This transfer will cause the unit to be set into operation and will cause the pusher plate to advance beyond its normal sold out position. As the pusher plate travels beyond its sold out position, the finger 94 engages the upstanding lug 96 on the pawl 90 and forces the latter into engagement with the ratchet 92, thereby positively preventing the clutch from connecting the empty conveyer to the drive shaft. Each unit may be provided with a pawl construction of the type described.

A similar result may be obtained by an electrical sold out control as shown in Figure 7A. In this form of control, each dispensing unit is provided with a lever 96a fixed to a shaft 97a. The lever 96a is engaged by a finger 94a on the pusher 95a. The shaft 97a extends lengthwise of a complete horizontal row of dispensing units and is provided with a lever 98a at one end for engaging a switch 99a connected in the motor circuit. When a transfer operation attempts to set a sold out unit into operation, the pusher finger 94a rocks the corresponding lever 97a counterclockwise and forces the lever 98a against the button of the switch 99a thereby deenergizing the drive motor and preventing recycling.

Figure 8:
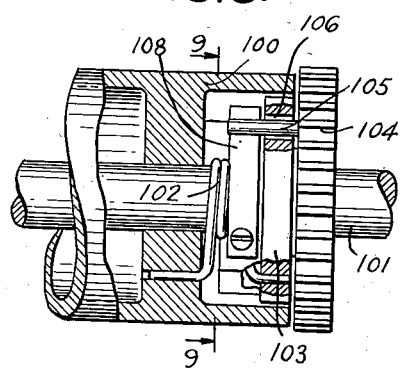
Figure 8 is a view in vertical section through the end of a roller showing a modified form of clutch mechanism therefor.
Figure 9:
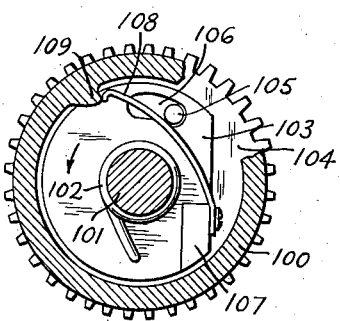
Figure 9 is a view in section taken on line 9—9 of Figure 8.

The clutch mechanism for connecting the drive rollers to the shafts is susceptible to considerable variation and provision may be made for freeing the roller completely from the drive shaft in order to permit the conveyer belt to be drawn backwardly and refilled with additional merchandise. A typical clutch having this advantage is disclosed in Figures 8 and 9. With this form of clutch, the roller 100 which drives the conveyer belt is also rotatably mounted on the motor driven shaft 101. The roller 100 is connected to one end of the clutch spring member 102 while the opposite end of the spring is connected to a plate 103 rotatably mounted on the shaft 101. The ratchet member 104 is also rotatably mounted on the shaft 101 and has a pin 105 thereon extending through an elongated slot 106 in the plate member 103. The ratchet thus is connected for limited movement with respect to the plate 103. The plate is also provided with a lug 107 having a spring 108 thereon which is adapted to engage a tooth 109 projecting inwardly from the inner periphery of the roller 100 to hold the clutch spring 102 in partially unwound and unclutch condition. In operation, when the ratchet 104 is not restrained against rotation, the spring 102 grips the shaft 101 and causes the ratchet 104, the plate 103 and the roller 100 to rotate with the shaft 101. The spring 108 is to the left of the tooth 109 and out of engagement with it. When the ratchet 104 is restrained by means of a pawl, the spring 102 is unwound, thereby releasing the roller 100 from the shaft 101. Also, the pin 105 is displaced along the slot 106 and permits relative clockwise rotation of the roller with respect to the plate 103 against the tension of the spring. If, however, it is desired to rotate the roller counter-clockwise, as viewed in Figure 9, with respect to the shaft, to refill the conveyer, the conveyer belt may be pulled back with the result that the roller rotates sufficiently far for the spring 108 to come into the position with respect to the tooth shown in Figure 9, inasmuch as this rotation of the roller displaces the pin 105 to the right-hand end of the slot 106. Engagement of the spring 108 with the tooth 109 latches the spring 102 in a partially unwound condition, and upon lifting the pawl, not shown, from the ratchet, the entire roller and ratchet assembly can be rotated relatively to the shaft 101, if, when the conveyer has been reloaded, the ratchet is turned relative to the roller 100, the spring 108 is released from the tooth 109 and the apparatus is then in a condition for further operation.

Figure 11:
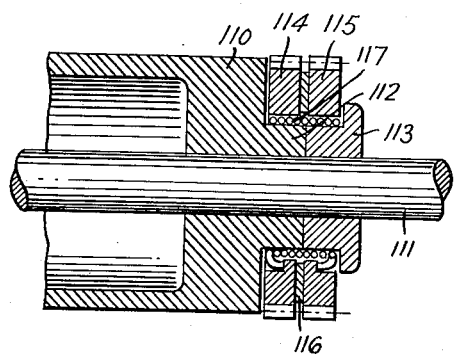
Figure 11 is a view in vertical section through one end of the clutching mechanism of the device shown in Figure 10 illustrating a modified form of clutching mechanism.
Figure 12:
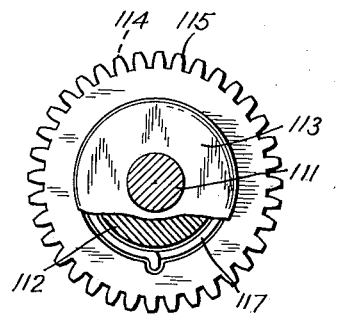
Figure 12 is an end view of the device shown in Figure 11 partly broken away to disclose details of construction.
Figure 10:
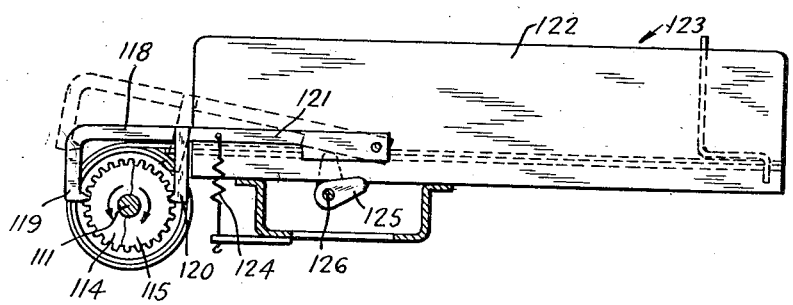
Figure 10 is a view in side elevation of a modified form of dispensing unit.

Still another and preferred form of clutch is illustrated in Figures 10, 11 and 12. This form of spring clutch for connecting and disconnecting the roller 110 and the shaft 111 includes a collar or sleeve 112 on the end of the roller which is in face-to-face engagement with a headed collar or sleeve 113 fixed to the shaft 111. Rotatably mounted on the sleeves 112 and 113 are a pair of ratchet members 114 and 115 which are retained in spaced relationship by means of a washer 116. A helical spring clutch element 117 is wrapped around the confronting ends of the sleeves 112 and 113 and is normally tensioned to grip both of these elements to connect the roller 110 to the collar 113. The ends of the spring 117 are connected to the ratchet members 114 and 115. So long as neither of the ratchets 114 or 115 is restrained against rotation, the spring 117 couples the shaft 111 with the roller 110 through the sleeve 113. When, however, the ratchets 114 and 115 are rotated in opposite directions to partially unwind the spring 117, the roller 110 is released from the shaft 111. This may be accomplished by means of the pawl construction 118 shown in Figure 10. The pawl construction 118 includes two opposed pawl elements 119 and 120 mouted on a common lever 121 which is pivotally mounted on the side plate 122 of the support 123.

The lever 121 is normally urged downwardly by means of a spring 124. When the pawls 119 and 120 move downwardly, they engage respectively with the ratchets 114 and 115 rotating them in opposite directions and unwinding the spring 117. The pawl structure 118 is moved upwardly to the dotted line position by means of the cam 125 which is mounted on a camshaft 126 like the camshaft 50 described above. The camshaft 126 is also rotated by other cam elements, not shown in Figure 10, but like those disclosed in Figure 3.

Figure 13:
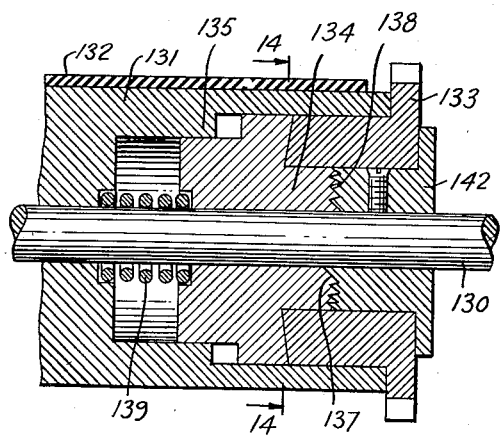
Figure 13 is a view in vertical section through still another form of roller and clutching mechanism therefor.
Figure 14:
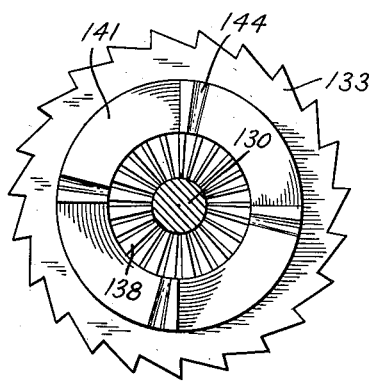
Figure 14 is an end view of one clutch element of the clutching mechanism disclosed in Figure 13.
Figure 15:
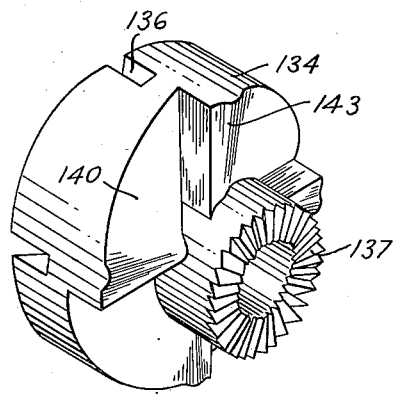
Figure 15 is an isometric view of the other clutch element of the device shown in Figure 13.

The clutching mechanisms described above are also susceptible to further modification, and, if desired, toothed clutches may be used instead of the spring clutches described above. Such a clutch is disclosed in Figures 13, 14 and 15. In this mechanism, in which only the operating elements are illustrated, the drive shaft 130 supports a drive roller 131 to advance a conveyer belt 132. The drive shaft 130 supports a suitable braking element 133, such as a ratchet, for relative rotation.

The drive roller 131 is provided with a clutch element 134 at one end thereof which is non-rotatably connected to, but axially slidable within, the roller 131 by means of splines 135 and grooves 136. This sleeve or clutch element 134 has a tooth clutch sleeve 137 thereon which cooperates with a complemental clutch 138 fixed to the drive shaft 130. The clutch element 134 is normally urged toward the clutch element 138 by means of a spring 139 interposed between the end of the roller 131 and the sleeve 134. Thus, the roller is normally connected to the drive shaft for rotation therewith.

The roller 131 may be disconnected from the shaft 130 by means of the ratchet 133 and other mechanism. The sleeve 134 is provided with inclined cam surfaces 140 which cooperate with similar inclined cam surfaces 141 on the ratchet sleeve 133. The ratchet is maintained against axial displacement to the right by means of a collar 142 which carries the clutch teeth 138 and receives the ratchet 133 rotatably.

When the ratchet 133 is restrained against rotation, the inclined cam surfaces 140 and 141 will rotate relatively until the clutch elements 137, 138 disengage due to axial displacement of the member 134.

The rib 143 and groove 144 on the cam surfaces 140 and 141 assure positive engagement of the clutch elements. The ratchet 133 is controlled by means of a pawl member like any of those described above.

Figure 16:
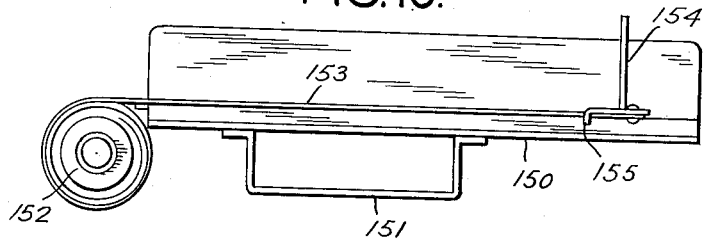
Figure 16 is a view in section through a modified form of dispensing unit support illustrating a modified form of conveyer therefor.

In some instances, it may be desirable to have the dispensing units individually controlled, for example, when dispensing articles of different character or nature from a series of different units under the control of the purchaser. Devices of this type are disclosed more particularly in the Tandler et al. application Serial No. 676,226 and Patents Nos. 2,500,437 and 2,500,438. Dispensing units embodying generally the same principles of operation as those described above may be used in such devices under positive electrical control. Typical forms of devices of this type are disclosed in Figures 16, 17 and 18 of the drawings. As shown in Figure 16, these units may include a support 150 similar to that described above supported on a transverse channel member 151 and having a rotary member or roller 152 for moving a conveyer 153 along the support. The conveyer may be provided with a pusher plate 154 having a forwardly and downwardly projecting tongue thereon for cooperating with a limit switch, not shown, for preventing overrunning of the conveyer. One form of control mechanism for this dispensing unit may include a spring clutch or mechanical clutch of any of the types described above for connecting the roller 152 to the drive shaft 156. Only the ratchet 157 of the clutch mechanism is disclosed in Figure 17. The ratchet 157 cooperates with a pawl member 158 which is pivotally mounted on a lever 159, also pivotally supported at 160 on the channel member 151. Beneath the channel member 151 is a control box 161 containing a solenoid coil 162 cooperating with a pivotally mounted armature 163 which is connected by means of a link 164 to the bottom end of the lever 159. Thus, when the coil 162 is energized, the lever 159 is rocked to disengage the pawl 158 from the ratchet 157 in the same manner as the pawl and ratchet mechanism disclosed in Figure 2.

An additional feature of this construction is the provision of a retaining device for preventing the discharge of articles from the support 159 when the roller 152 is disconnected from the shaft 156. This retaining mechanism includes a cross bar 165 supported at its opposite ends by means of generally S-shaped levers 166 which are pivotally supported at 167 on a downwardly projecting plate 168 on each side of the support 159. The bar 165 is urged toward the dotted line position by means of a spring 169 connected between the end of the S-shaped member 166 and the plate 168. The S-shaped member 166 is also provided with a pin 170 which is disposed in front of a downwardly projecting arm 171 on the pawl member 158. Thus, when the pawl 158 is pushed forward by energization of the solenoid coil 162, the S-shaped members 166 and the cross bar 165 are rocked to the full line position. When the coil 162 is deenergized at the end of a dispensing operation, the pawl 158 moves rearwardly into engagement with the ratchet 157 and also permits the cross bar 165 to be moved to the dotted line position, thereby preventing removal of articles from the conveyer 153, for example, by shaking the dispensing device.

Another type of electromechanical control for a dispensing unit is shown in Figure 18. This form of device includes a drive roller 180 having a control ratchet 181 thereon which cooperates with a pawl 182 to prevent rotation of the roller 180 by the shaft 183 when the pawl is in the position shown. The pawl 182 can be moved out of engagement with the ratchet by means of a lever 184 pivotally mounted on a side plate 185 on the support 186 to permit rotation of the roller 180. The pawl 182 is urged downwardly toward the ratchet 181 by means of a spring 187 which retains the pawl against a pin 187a.

The lever 184 is advanced to disengage the pawl from the ratchet by means of a cam member 188 fixed to a shaft 189 which also carries a drum 190 having a cam surface including a shoulder 191 therein. The shoulder cooperates with a plate 192 carried by a stop finger 193 which is pivotally connected to the plate 185 and is normally urged upwardly by the spring 194. The shaft 189 is normally urged into the position illustrated with the pawl 182 in engagement with the ratchet by means of the spring 195. The cam 188 is also connected to the armature 196 of a solenoid coil 197 which may be energized from a remote point.

When the solenoid 197 is energized, the armature 196 is drawn downwardly, thereby rotating the shaft 189 counterclockwise and displacing the pawl 182 out of engagement with the ratchet 181, thereby permitting the shaft 183 to drive the roller 180. When an article is discharged over the roller 180, it will strike the finger 193.

When the shaft 189 is rotated by the armature, the shoulder 191 of the cam is displaced so that it is to the left of and engages against the cross plate 192 on the finger 193. Therefore, regardless of whether the solenoid coil is deenergized, the roller 180 will be driven until an article strikes the finger 193, as referred to above. When this occurs, the finger 193 is rocked downwardly to disengage the cross plate 192 from the shoulder 191, thereby permitting the spring 195 to rock the cam 188 and the drum 190 to the position shown. The pawl then engages the ratchet 181 and disconnects the roller 180 from the shaft 183.

From the preceding description of typical forms of the invention, it will be apparent that we have provided simplified forms of clutch mechanisms which are highly effective in controlling the operation of dispensing devices of the type described and which permit such operation with a minimum of friction and power.

It will be understood that the system is susceptible to considerable modification in its details, and, therefore, the forms of the invention described herein should be considered as illustrative and not as limiting the scope of the following claims.

We claim:

1. An article dispensing device comprising a plurality of article supporting and advancing means, each supporting and advancing means comprising a support, a drive shaft, a rotary member rotatably mounted on said shaft, means mounted on said support and connected with said rotary member for advancing articles along said support, a ratchet member mounted on said shaft and normally rotatable with said rotary member, clutch means on said shaft, cooperating clutch means carried by said rotary member for connecting the latter to said shaft, means carried by said ratchet member for disengaging said clutch means on said shaft and said rotary member when said ratchet is restrained against rotation, a pawl movable into and out of engagement with said ratchet to restrain and release said ratchet, and a series of cam elements, each element being adjacent a different pawl, and means for moving said cams to successively disengage said pawl from their corresponding ratchets to cause said rotary members to be driven in succession by said shaft.

2. An article dispensing device comprising a plurality of article supporting and advancing means, each supporting and advancing means comprising a support, a drive shaft, a rotary member rotatably mounted on said shaft, means mounted on said support and connected with said rotary member for advancing articles along said support, a ratchet member mounted on said shaft and normally rotatable with said rotary member, clutch means on said shaft, cooperating clutch means carried by said rotary member for connecting the latter to said shaft, means carried by said ratchet member for disengaging said clutch means on said shaft and said rotary member when said ratchet is restrained against rotation, a pawl movable into and out of engagement with said ratchet to restrain and release said ratchet, and a series of cam elements, each element being adjacent a different pawl, and a member carried by each of said means for advancing articles along said support to move said cams to disengage said pawls successively from their corresponding ratchets to cause said rotary members to be driven in succession by said shaft.

3. An article dispensing device comprising a plurality of article supporting and advancing means, each supporting and advancing means comprising a support, a drive shaft, a rotary member rotatably mounted on said shaft, means mounted on said support and connected with said rotary member for advancing articles along said support, clutch means on said shaft, a cooperating clutch element carried by said rotary member for connecting the latter to said shaft, a lever pivotally mounted on said support movable to a position to disengage said clutch element and said clutch means, a first mechanism actuated by said means connected to said rotary mechanism for advancing articles as it advances to a position for discharging the last article therefrom, to move its lever and disengage its corresponding clutch means and clutch element, and other mechanism connected to and actuated by and with said first mechanism to move the lever of an adjacent supporting and advancing means to connect the rotary member of said adjacent supporting and advancing means to said shaft.

WILLIAM S. TANDLER.
ROBERT G. FLEURIOT.
CARLTON F. PECK.

REFERENCES CITED

The following references are of record in the file of this patent:

UNITED STATES PATENTS

| Number | Name | Date |
|---|---|---|
| 232,241 | Coltman | Sept. 14, 1880 |
| 1,355,488 | McKenney | Oct. 12, 1920 |
| 1,428,589 | Helt | Sept. 12, 1922 |
| 1,791,768 | Van Berkel | Feb. 10, 1931 |
| 1,857,881 | Scott et al. | May 10, 1932 |
| 1,877,050 | Ray | Sept. 12, 1932 |
| 1,986,714 | Clayton | Jan. 1, 1935 |

FOREIGN PATENTS

| Number | Country | Date |
|---|---|---|
| 392,584 | Germany | of 1924 |